Patented Nov. 19, 1929

1,736,657

UNITED STATES PATENT OFFICE

CORNELIUS MASSATSCH, OF BERLIN, GERMANY, ASSIGNOR TO MATRO G. M. B. H., OF HEILBRONN ON NECKAR, GERMANY, A FIRM

METHOD OF MANUFACTURING DRY YEAST FOR MEDICAL AND PHARMACEUTICAL PURPOSES

No Drawing. Application filed December 21, 1927, Serial No. 241,731, and in Germany April 4, 1925.

The rising attention which yeast finds as a therapeutic means is founded partly upon the undiminished value of its nitrogen contents which contain all building-up substances animal organisms require, and partly upon the manifoldness and richness of ferments and vitamines, so that yeast when being used as a curative is not only able to quickly and thoroughly do away with, or to prevent, the detrimental effects of one-sided feeding with insufficient nourishments, but also to be used in many ways as a means for fighting organic diseases and disturbances of bodily functions.

If, in spite of this, the yeast in its various permanent forms has found only little application as a therapeutic means, as well as a means for strengthening and invigorating the body in cases of weakening ailments, also as a supplementing substance, this moderate result is due first of all to the deficient and complicated composition of the yeast organism, dressing methods in which too little regard is paid and in which is omitted to free the yeast from its useless and disagreeable ballast substances.

Most dry compounds existing on the market are produced in this way that the yeast pulp which has been washed more or less either with ordinary water or with alkaline water is merely dried in an ordinary drying apparatus or with the aid of drying drums, the product being then suitably ground and sifted and, finally, sold.

There is, in a procedure like that, no regard paid to the fact that the yeast cell contains sensitive phosphates, fat and extracted substances which undergo great changes in that procedure, the odor and taste of the products of decomposition being, finally, transferred onto the product, in consequence of which all dry commercial yeast products suffer from a taste which resembles partly that of cheese and partly that of practically tasteless meat-extract, or is savoury in a degree which would not be complained of in a flavoring or seasoning substance, but is not admissible in a compound constituting a dietetic medicament, in that such a one must be indifferent as much as possible as regards its taste. It has, indeed, been discovered that by treating such commercial dry compounds for ½ hour with diluted spiritus vini of from 65 to 70% at a temperature of from 60 to 65 up to 20% of badly smelling component parts of fat, fatty acids, lecithines and other undefinable component parts containing nitrogen, phosphorus and sulphur can be separated, the respective component parts having resulted most probably from the decomposition of the nucleine substances arising in an ample amount in the yeast cell, remaining in the cellular skeleton and rendering the valuable albuminiferous substances impure.

These observations are the more valuable as dry yeasts are highly valuable for therapeutical purposes and they occupy constantly an important place among the official medicines.

Under such circumstances particular attention must be paid to obtaining products which are not only effective, but are also unobjectionable as regards odor or taste.

While being occupied with the matter I have discovered that it is easily possible to remove also from fresh yeast, and when treating yeast in the above-mentioned manner, the unsuited component substances by means of diluted spiritus vini, and that the thus treated yeast constitutes a product unobjectionable in every respect.

*Example.*—1 kg. of fresh, well pressed wet yeast of the composition:

| | Per cent |
|---|---|
| Moisture | 76,68 |
| Dry substance | 23,32 |
| Nitrogen in the dry substance | 9,75 |
| Albumen | 60,9 |
| Ashes | 8,1 | is transfused with 2 liters of denaturalized wood-spirit of 95% and heated in a steam-bath to from 55–65° C. for ½ hour. Within this time the yeast cake deliquesces gradually in the liquid and forms in this latter a homogeneous thin pulp, whereas the liquid above mentioned assumes a light-brown color. The yeast pulp and the liquid are now separated from one another by a sucking filtering apparatus, and the remaining pulp is washed twice with a little spirit, the adhering liquid is well pressed out, the yeast pressed through a sieve, and the product thus obtained is dried first for from 2 to 3 hours at a temperature of from 65 to 70° C. and then at ordinary temperature.

To remove also the last traces of the dissolvent it has been found suited to roast the pulverulent yeast for a comparatively short time, say from 1 to 2 hours, at a somewhat high temperature, say from 150 to 160° C. The wholesomeness and the agreeable taste of the final product are not only not impaired by this treatment, but in fact enhanced, and a surprising effect consists, besides, therein that the particular effects produced by the vitamines of the yeast substance is found also in the final product mentioned and obtained in the manner described. This fact has been proved by means of pigeons which have been rendered sick from beri-beri by being fed exclusively with polished rice.

From 1 kg. of fresh beer yeast have been obtained:

|  | Grams |
|---|---|
| Dry yeast | 202 |
| Phosphorous substances resembling lecithine and being undissoluble in acetone | 5 |
| Dry extract containing phosphorus and sulphur | 23 |
| Raw fat | 3 |

As to the applicability of the process it is left to the discretion of the operator to deprive the moist yeast wholly or partly from adhering liquid by drying it preliminarily in vacuo or with the aid of a drying drum prior to treating it with the spirit, and only then to effect this treatment.

I am aware of the fact that the treatment of yeast with spirit, ether or acetone is known, but this treatment has been applied to the manufacture of yeasts permanently adapted to cause fermentation, these yeasts being rendered sterile, it is true, by a short action of the dissolvent at ordinary temperature, but their encymatic, sugar-fermenting properties being not impaired. Apart from the fact, yeasts of this kind are useless for the purposes in view, also the respective methods cannot be practically employed in view of their expensiveness. The present improved process aims at the manufacture of a non-fermentative yeast substance for medical and pharmaceutical purposes in a manner answering fully all conditions met with in practice. The loss in extracted substances is so small that it does not constitute an item worth mentioning.

I am also aware of a method in which yeast is worked up in a particular manner with the object to obtain nourishing compounds. The yeast is preliminarily purified, deprived of the adhering liquid, and heated for several hours to 85° C. whereby the cellular walls are caused to burst and the cellular liquid is permitted to escape, and in order to improve the taste of the products the extract obtained is precipitated, prior to the drying out, by means of alcohol, the precipitate being then freed from the adhering moisture, dried and reduced to powder. The present improved method is not identical with said known one, in that the manufacture of an extract is not aimed at and no roasting of the yeast to 150–160° C. takes place. Besides, removing a certain impurities from an extract by precipitating the desired substances by means of spirit differs fundamentally from separating the impurities from out of the cells without damaging the structure or texture of these latter or impairing therapeutically important components.

I claim:

1. The method of manufacturing dry yeasts for medical and pharmaceutical purposes, consisting in treating fresh yeast directly with spirit at a temperature of from 55 to 65° C.

2. The method of manufacturing dry yeasts for medical and pharmaceutical purposes, consisting in treating fresh grain-yeast directly with spirit at a temperature of from 55 to 65° C.

3. The method of manufacturing dry yeasts for medical and pharmaceutical purposes, consisting in treating fresh mineral yeast directly with spirit at a temperature of from 55 to 65° C.

4. The method of manufacturing dry yeasts for medical and pharmaceutical purposes, consisting in washing fresh yeast with a suitable liquid, and treating it thereafter directly with spirit at a temperature of from 55 to 65° C.

5. The method of manufacturing dry yeasts for medical and pharmaceutical purposes, consisting in washing fresh yeast with water and treating it thereafter directly with spirit at a temperature of from 55 to 65° C.

6. The method of manufacturing dry yeasts for medical and pharmaceutical purposes, consisting in washing fresh yeast with a thin alkali solution treating it thereafter directly with spirit at a temperature of from 55 to 65° C.

7. The method of manufacturing dry yeasts for medical and pharmaceutical purposes, consisting in drying fresh yeast preliminarily, and treating it thereafter directly with spirit at a temperature of from 55 to 65° C.

8. The method of manufacturing dry yeasts for medical and pharmaceutical purposes, consisting in depriving fresh yeast by pressure from the adhering moisture, and treating it thereafter directly with spirit at a temperature of from 55 to 65° C.

9. The method of manufacturing dry yeasts for medical and pharmaceutical purposes, consisting in treating fresh yeast directly with denaturized spirit at a temperature of from 55 to 65° C.

10. The method of manufacturing dry yeasts for medical and pharmaceutical purposes, consisting in treating fresh yeast at a temperature of from 55 to 65° C. directly with spirit denaturized by wood spirit.

11. The method of manufacturing dry yeasts for medical and pharmaceutical purposes, consisting in treating fresh yeast directly with spirit at a temperature of from 55 to 65° C. and roasting weakly the thus treated yeast at a high temperature.

12. The method of manufacturing dry yeasts for medical and pharmaceutical purposes, consisting in washing fresh yeast with water, treating it thereafter directly with denaturized spirit at a temperature of from 55 to 65° C., substantially as set forth.

13. The method of manufacturing dry yeasts for medical and pharmaceutical purposes, consisting in washing fresh yeast with a thin alkali solution, and treating it thereafter at a temperature of from 55 to 65° C. directly with spirit denaturized by wood spirit, substantially as set forth.

14. The method of manufacturing dry yeasts for medical and pharmaceutical purposes, consisting in drying fresh yeast preliminarily, treating it thereafter directly with denaturized spirit at a temperature of from 55 to 65° C., and roasting weakly the thus treated yeast at a high temperature.

15. The method of manufacturing dry yeast for medicinal and pharmaceutical purposes, consisting in subjecting yeast to the action of alcohol at a temperature from 55 to 65° C. to form a thin pulp, extracting the liquid, drying the resulting mass, and then subjecting this dried mass to the action of heat at a temperature from 150 to 160° C.

CORNELIUS MASSATSCH.